UNITED STATES PATENT OFFICE.

ROBERT A. CHESEBROUGH, OF NEW YORK, N. Y.

IMPROVEMENT IN PURIFYING PETROLEUM, &c.

Specification forming part of Letters Patent No. 56,179, dated July 10, 1866.

*To all whom it may concern:*

Be it known that I, ROBERT A. CHESEBROUGH, of New York city, State of New York, have invented a new Process of Heating and Dressing Bone-Black for Filtering Hydrocarbon Oils, as hereinafter specified.

The object of my invention is to quicken the process of filtering hydrocarbon oils; and the nature of my invention is heating bone-black by dry steam or other heat to about 220° Fahrenheit until all the moisture is expelled from the bone-black, freeing the pores, and using it while hot, by which means I deodorize and decolorize the oils, and the process of filtering is rapidly promoted and much time saved.

I do not desire to confine myself to any particular mode of heating the bone-black, as it may be accomplished in many ways—by heating it in retorts, flat pans, or by steam-jackets—but I apply dry steam or heat to a retort or pan until the bone-black is heated or dressed to such a degree that its moisture has been expelled and its pores opened, but not so hot as to vaporize or expel its oily substance, and when hot I then use it for filtering the oils. Therefore

What I claim as my invention, and desire to secure by Letters Patent. is—

The heating of bone-black by dry steam or otherwise previous to using the same for filtering hydrocarbon oils.

ROBT. A. CHESEBROUGH.

Witnesses:
 EDWIN F. COREY, Jr.,
 R. C. KEARNY.